United States Patent [19]

Wallquist et al.

[11] Patent Number: 4,494,838

[45] Date of Patent: Jan. 22, 1985

[54] RETINAL INFORMATION MAPPING SYSTEM

[75] Inventors: Donald L. Wallquist; Gilbert G. Kuperman, both of Dayton, Ohio

[73] Assignee: The United States of America as represented by the Secretary of the Air Force, Washington, D.C.

[21] Appl. No.: 398,132

[22] Filed: Jul. 14, 1982

[51] Int. Cl.³ .............................................. A61B 3/14
[52] U.S. Cl. ................................. 351/206; 351/205; 351/200; 382/52
[58] Field of Search .................. 382/52; 351/206, 207, 351/208, 209; 364/521, 522, 518

[56] References Cited

PUBLICATIONS

Otto H. Schade, Sr., "Optical and Photoelectric Analog of the Eye", Journal of the Optical Society of America, pp. 721, 738 & 739.
Tom N. Cornsweet, "Visual Perception," Academic Press: New York, 1970.
Clarence H. Graham, "Vision and Visual Perception", cover sheet & p. 49.

*Primary Examiner*—Rodney B. Bovernick
*Assistant Examiner*—Paul Dzierzynski
*Attorney, Agent, or Firm*—Donald J. Singer; Bernard E. Franz

[57] ABSTRACT

The mapping provides a capability for quantifying an external scene in a manner equivalent to the allocation at perceptual bandwidth in the human retina. The device samples the scene, either photographically or by video; records a digital version of the scene, processes the digital version so that the effects of the distribution rods in the retina provides the weighting for allocating signal processing bandwidth differentially across the scene in accordance with human physiological data, and produces a recording of the processed digital image.

The processing uses a selected acuity factor as a parameter, a neighborhood is assigned to each pixel, with a radius r equal to $(1.0+(\text{acuity factor} \times R))/2.0$, where R is the distance from the center of the image. The digital values of all pixels in the neighborhood are summed and the sum is divided by the number of pixels in the neighborhood to obtain an average value. This value is then assigned to the pixel in forming a processed image frame.

4 Claims, 3 Drawing Figures

RETINAL INFORMATION MAPPING SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to an imaging system providing an analog of the eye by a mapping corresponding to retinal information.

It would be desirable to be able to simulate with an image display what the human vision system would perceive under various conditions. These conditions can relate to defects of the eye, to the effects of lenses or other optical devices, or to conditions of the atmosphere such as haze.

An article by O. H. Schade, Sr., "Optical and Photoelectric Analog of the Eye", in the Journal of the Optical Society of America, Vol 46, No. 9, September 1956, describes an analog of a visual system patterned after a television system working with a computer.

SUMMARY OF THE INVENTION

An object of the invention is to provide a system to determine the effects on vision of various conditions.

The system according to the invention provides a capability for quantifying an external scene in a manner equivalent to the allocations of perceptual bandwidth in the human retina. The device samples the scene, either photographically or by video; records a digital version of the scene, processes the digital version so that the effects of the distribution of rods in the retina provides the weighting for allocating signal processing bandwidth differentially across the scene in accordance with human physiological data, and produces a recording of the processed digital image.

The combination of digital signal processing and electro-optical viewing/recording provides a new way to access the information content of visual scenes. It provides a direct and quantitative means to determine the spatial distribution of scene spatial frequency content in a way analogous to the sampling of that information by the observer.

The invention provides (1) a way to simulate the nonlinear affects of visual acuity across the visual field, and (2) provides a quantitative mapping of scene intensities as they would be weighted by differential visual acuity and as they are available for post-sensory (i.e., cognitive) processing in the brain.

DETAILED DESCRIPTION

Figure 1:
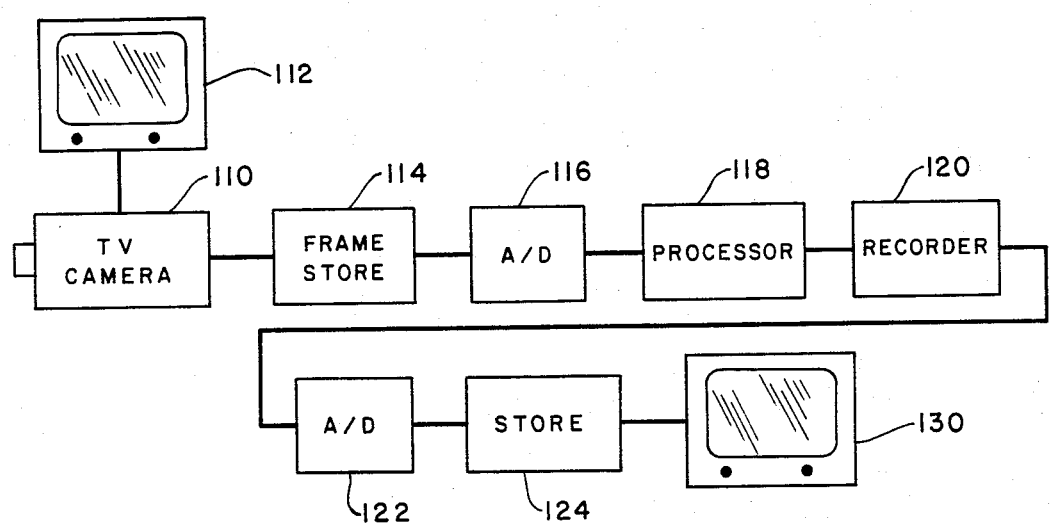
FIG. 1 is a functional block diagram of a system for carrying out the invention.

Referring to FIG. 1, a scene may be imaged by a television camera 110 (or by other means) A frame of video is selected in frame store 114 and digitized by an A/D converter 116. The frame is processed in a processor 118, and then stored in a recorder 120. The image may then be converted to analog form in a converter 122 and placed in a store 124. The image may then be viewed on a cathode ray tube 130.

Physiological data of interest can be found in a book by T. N. Cornsweet, *Visual Perception*, Academic Press, New York, 1970. His FIG. 2.3 is captioned "Rod receptor cell density as a function of the horizontal location across the retina of the right eye. (The 'blindspot', a region where there are no visual receptors, will be discussed later.)". Reference is also made to a book with C. H. Graham as editor, *Vision and Visual Perception*, John Wiley & Sons, Inc., New York, 1965. His FIG. 2.11 is captioned "Distribution of Rods and cones along a horizontal meridian. Parallel vertical lines represent the blind spot. Visual acuity for a high luminance as a function of retinal location is included for comparison. (From Woodson, 1954; data from Osterberg, 1955 and Wertheim, 1894.)".

Figure 2:
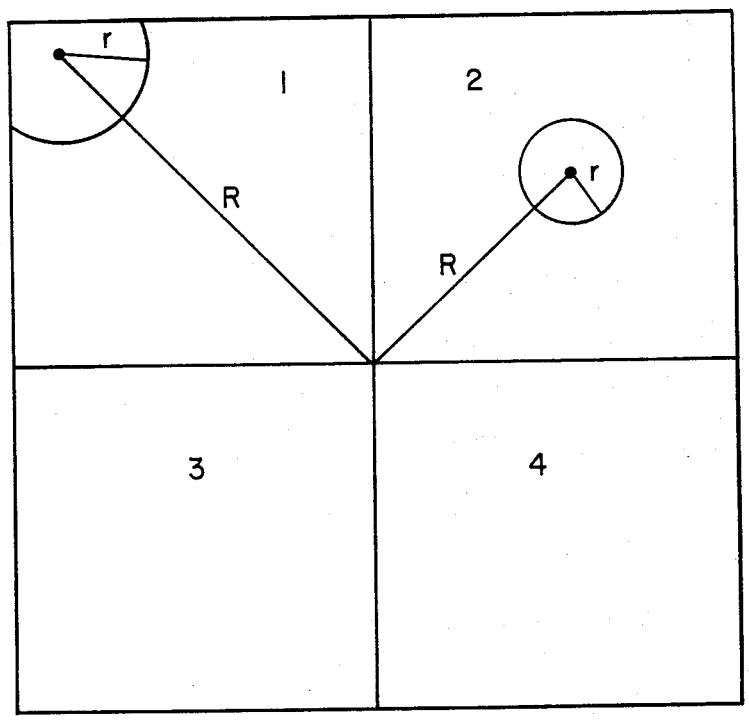
FIG. 2 is a symbolic diagram of an image area to show the division into four quadrants, and the processing neighborhoods.

FIG. 2 is a diagram of an image area showing the designation of the four quadrants for processing. The image may have a maximum of $512 \times 512$ pixels, and each pixel is digitized to 8 bits. Each pixel is processed, making use of its radius R from the center of the image, and a neighborhood around the pixel having a radius r.

The array of the digitized frame is processed so that a non-linear smoothing of the intensity values is carried out. This smoothing operation is accomplished on the basis of physiological data regarding the distribution of rods across the retina and perceptual data regarding differential visual acuity as a function of retinal field angle. The figure from Cornsweet (1970) shows the distribution of rods per $mm^2$, across the retina as a function of distance and, alternatively, visual angle. The figure from Graham (1965) shows both relative visual acuity and rod density as a function of visual field. The relative visual acuity curve is implemented in the invention as follows.

An adaptive convolution is performed on the digital scene. For each point in the $512 \times 512$ array, the radial distance to the array center (which corresponds to the fovea) is determined, R. An averaging operation is performed for all image points around the subject point and within a radius r of that point where $r = (1.0 + (\text{visual acuity factor} \times R))/2.0$, where R is the radial distance to the image center and the visual acuity factor is an input parameter used to normalize the lateral dimension of the image in terms of the visual field angle. The point is then replaced by the average value and the next point is processed. (Smaller values of the visual acuity factor are appropriate to images which subtend smaller visual angles.) Because of symmetry, R and r pairs need only be computed for one quadrant of the image and reused, in table look-up fashion, for corresponding points in the other three quadrants. The output array is composed of new, filtered, values. This output array can be displayed on a CRT, with brightness proportionate to digital value, or reconstructed onto photographic film, with transmittance proportionate to digital value. Useful values of the visual acuity factor are in the range from zero up to 0.500. As the value increases, the output image becomes less clear. At a value of 1.0 the output image is completely blurred.

In the laboratory, the system shown in FIG. 1 has been implemented using an image processor model 70/E from International Imaging Systems (formerly Stanford Technology Corporation), and a PDP 11/34 computer with a Floating Point Cache Memory and RK07 disk drives. The image processor provides the original input image from the camera to the computer and performs the analog-to-digital conversion. It also receives the resulting processed image from the computer, and can provide an output of the image to a monitor.

Figure 3:
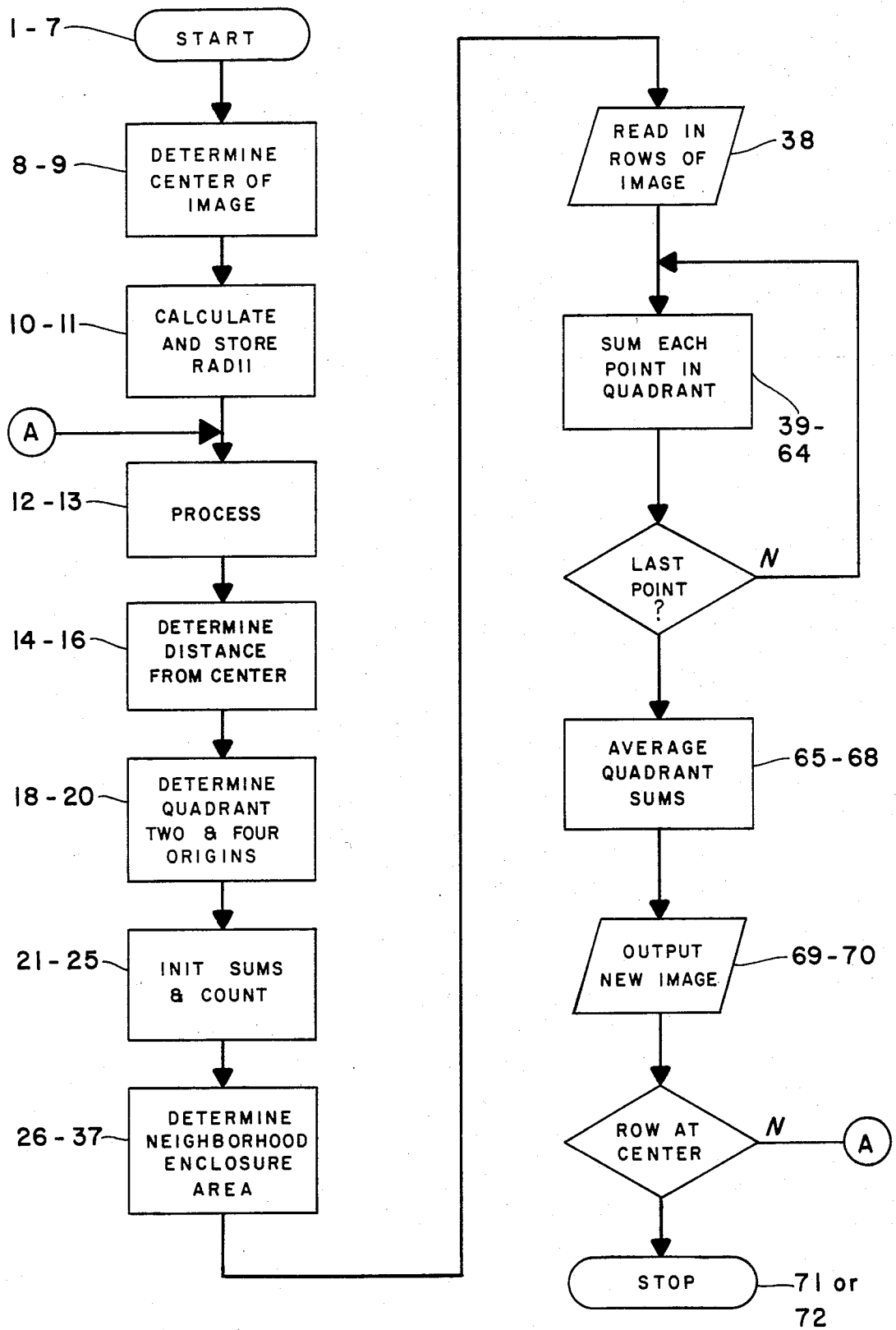
FIG. 3 is a flow chart of a computer program.

A flow chart of the computer program is shown in FIG. 3, and the listing in FORTRAN IV-PLUS is given at the end of this specification. The program is a subroutine for calculating all of the values of the neighborhood radius r for all possible values of R with a given value for the visual acuity factor, and then performing the averaging for the neighborhood of each point in all four quadrants.

The visual acuity factor is the parameter which is supplied by the operator for each run. Line 7 assures that it is real variable. The program at line 9 et seq. calculated and stores all possible neighborhood radii in a 512×512 image, even though the actual image being processed may contain fewer pixels. Note that a unit distance is the horizontal or vertical distance between the centers of adjacent pixels. The maximum value of R is 730, the radius R being the distance from the center of the image to a given pixel. This is the variable I in the DO loop beginning at line 10. The variable RADS(I) is used for the neighborhood radius r calculated at line 11. Because of symmetry, the value of r is calculated for one quadrant, and then used for all four quadrants. Note for some pixels near the edges of the image, that the neighborhoods are not complete circles, being bounded by the image edges. Only pixels actually within the image area are counted, and their digital values averaged.

The program causes the rows of the image to be read. In each quadrant, in the neighborhood of each pixel, the digital values of all of the pixels are summed together and the number of pixels is counted. Then for each pixel of each quadrant, the sum is divided by the count to obtain a new pixel value. The new values are then the output for an image frame.

Note that the condition provided by the acuity function used is a radial (not overall) defocus of the image. This corresponds to the functioning of the human eye which is focused (i.e., fixated) on the center of an image. Even with very good vision, an image becomes progressively defocused and fuzzier toward the perimeter of the image. The visual acuity factor supplied to the processor may be changed to simulate various eye defects or lense defects. Even haze in the atmosphere may be simulated by one sufficiently skilled.

Thus, while preferred constructional features of the invention are embodied in the structure illustrated herein, it is to be understood that changes and variations may be made by the skilled in the art without departing from the spirit and scope of my invention.

Grid patterns and Resolving Power Tribar Groups as used by the U.S. Air Force were reconstructed successfully, demonstrating the sensitivity of the invention to differing acuity levels. Also, photographs of aircraft were successfully processed in this manner.

```
      C
      C
      C   ACUITY FUNCTION = (1.0+ACUITY * RADIUS)/2.0
      C
0001        SUBROUTINE RET(RADS,D,E)
      C
0002        DIMENSION RADS(730)
      C
0003        INTEGER ORG2,ORG4,FCB(6)
0004        INTEGER*4 SUM1,SUM2,SUM3,SUM4,COUNT
      C
0005        COMMON/SEMBUF/M1(512),M2(512),M3(512)
      C
0006        DATA ACUH/3RACU/
      C
      C   OBTAIN ACUITY FACTOR FROM OPERATOR
      C
0007        ACUITY=VAL(ACUH)
      C
      C   DETERMINE THE CENTER OF THE IMAGE
      C
0008        NREAL=NROW/2
0009        CENTER=NCOL/2.0
      C
      C   CALCULATE AND STORE ALL POSSIBLE NEIGHBORHOOD RADII IN
      C   A 512 x 512 SIZE IMAGE
      C
0010        DO 100  I=1,730
0011  100      RADS(I)=(1.0 + ACUITY * I)/2.0 + .5
      C
      C   DO ACTUAL PROCESSING
      C
0012        DO 1110  IROW=1,CENTER
0013          DO 1100  ICOL=1,CENTER
      C
      C   DETERMINE DISTANCE FROM CENTER OF IMAGE
      C
0014            ROW=CENTER - IROW + 1.0
0015            COL=CENTER - ICOL + 1.0
0016            RADIUS=(ROW**2+COL**2)**.5 + .5
```

```
C
C    OBTAIN THE RADIUS OF THE NEIGHBORHOOD FOR THAT DISTANCE
C
0017            RADIUS=RADS(RADIUS)
C
C    LOCATE THE CENTERS OF QUADRANTS TWO AND FOUR
C
0018            BOT=IROW+RADIUS
0019            ORG2=NCOL-ICOL+1
0020            ORG4=NROW-IROW+1
C
C    INITIALIZE QUADRANT SUMS AND COUNT (NUMBER OF POINTS AVERAGED)
C
0021            SUM1=0
0022            SUM2=0
0023            SUM3=0
0024            SUM4=0
0025            COUNT=0
C
C    START PROCESSING EACH NEIGHBORHOOD
C
0026            DO 1000  I=IROW,BOT
C
C    DETERMINE NEIGHRBORHOOD ENCLOSURE AREA
C
0027             ROW=I-IROW
0028             P=(RADIUS**2-ROW**2)**.5 +.5
0029             P1=ICOL-P
0030             IF(P1.LT.1.0)P1=1.0
0031             P2=ICOL+P
0032             P3=ORG2-P
0033             P4=ORG2+P
0034             IF(P4.GT.NCOL)P4=NCOL
0035             I2=IROW-ROW
0036             I3=ORG4+ROW
0037             I4=ORG4-ROW
C
C    OBTAIN TOP ROW OF QUADRANTS ONE AND TWO FROM IMAGE
C    PROCESSING SYSTEM
C
0038             CALL IMAGE(FCB,M1,0,I-1,NCOL,0,2,-1,0,1,0,0,0,0,1)
C
C    PROCESS TOP OF QUADRANT ONE
C
0039             DO 200   J=P1,P2
0040               SUM1=SUM1+M1(J)
0041     200       COUNT=COUNT+1
C
C    PROCESS TOP OF QUADRANT TWO
C
0042             DO 300   J=P3,P4
0043     300       SUM2=SUM2+M1(J)
C
C    TEST FOR COORDINATES OUTSIDE OF IMAGE BOUNDS
C
0044             IF(I2.LT.1)GOTO 510
C
C    OBTAIN BOTTOM ROWS OF FIRST AND SECOND QUADRANTS FROM
C    IMAGE PROCESSING SYSTEM
C
0045             CALL IMAGE(FCB,M1,0,I2-1,NCOL,0,2,-1,0,1,0,0,0,0,1)
C
C    PROCESS BOTTOM OF QUADRANT ONE
C
0046             DO 400   J=P1,P2
0047               SUM1=SUM1+M1(J)
0048     400       COUNT=COUNT+1
```

```
C
C   PROCESS BOTTOM OF QUADRANT TWO
C
0049                DO 500    J=P3,P4
0050        500         SUM2=SUM2+M1(J)
0051        510     CONTINUE
C
C   TEST FOR OUT OF BOUNDS COORDINATES
C
0052                IF(I3.GT.NROW)GOTO 710
C
C   OBTAIN TOP ROW OF QUADRANTS THREE AND FOUR FROM
C   IMAGE PROCESSING SYSTEM
C
0053                CALL IMAGE(FCB,M1,0,I3-1,NCOL,0,2,-1,0,1,0,0,0,0,1)
C
C   PROCESS TOP OF QUADRANT THREE
C
0054                DO 600    J=P1,P2
0055        600         SUM3=SUM3+M1(J)
C
C   PROCESS TOP OF QUADRANT FOUR
C
0056                DO 700    J=P3,P4
0057        700         SUM4=SUM4+M1(J)
0058        710     CONTINUE
C
C   OBTAIN BOTTOM ROW OF THIRD AND FOURTH QUADRANTS FROM
C   IMAGE PROCESSING SYSTEM
C
0059                CALL IMAGE(FCB,M1,0,I4-1,NCOL,0,2,-1,0,1,0,0,0,0,1)
C
C   PROCESS BOTTOM ROW OF THIRD QUADRANT
C
0060                DO 800    J=P1,P2
0061        800         SUM3=SUM3+M1(J)
C
C   PROCESS BOTTOM ROW OF FOURTH QUADRANT
C
0062                DO 900    J=P3,P4
0063        900         SUM4=SUM4+M1(J)
0064        1000    CONTINUE
C
C   DETERMINE RESULTANT AVERAGE GREY LEVEL VALUE REPRESENTING
C   ACUITY PIXEL VALUE
C
0065                M2(ICOL)=SUM1/COUNT
0066                M2(ORG2)=SUM2/COUNT
0067                M3(ICOL)=SUM3/COUNT
0068        1100    M3(ORG2)=SUM4/COUNT
C
C   REPLACE EACH OF THE PROCESSED NEIGHBORHOODS INTO A NEWLY
C   CREATED RESULTANT IMAGE
C
0069                CALL IMAGE(FCB,M2,0,IROW-1,NCOL,0,1,-1,0,1,0,0,0,0,0)
0070        1110    CALL IMAGE(FCB,M3,0,ORG4-1,NCOL,0,1,-1,0,1,0,0,0,0,0)
0071                RETURN
0072                END
```

PROGRAM SECTIONS

We claim:

1. A method of determining the effects on vision of various conditions by processing an image frame having a given number of pixels horizontally and vertically which comprises the steps of:

digitizing the value of each pixel;

the array of the digitized frame being processed so that a non-linear smoothing of the intensity values is carried out on the basis of physiological data regarding the distribution of rods across the retina and perceptual data regarding differential visual acuity as a function of retinal field angle, the relative visual acuity curve being implemented by performing an adaptive convolution on the digital scene, by determining for each point in the array the radial distance R to the array center (which corresponds to the fovea);

supplying a visual acuity factor as a parameter, useful values of the visual acuity factor being in the range of zero up to 0.500, increasing values producing output images which are less clear, and at a value of 1.0 the output image being completely blurred;

assigning to each pixel of the image a neighborhood having a radius r, the neighborhood comprising all pixels which are both within the radius r and within the image boundary, the radius r being a function of said visual acuity factor and of the distance R of the pixel from the center of the image, so that the effects of the distribution of rods in the retina provides the weighting for allocating signal processing bandwidth differentially across the scene in accordance with human physiological data;

for each pixel, summing the digital values of all pixels within its neighborhood, counting the number of pixels in the neighborhood, dividing the resulting sum by the resulting count to form an average value, and assigning that average value as a new digital value for the pixel;

forming a new image frame with said new digital values for all of the pixels, providing an output array composed of the new filtered values; and supplying the output array to display means for viewing, with intensity proportionate to digital value.

2. The method according to claim 1, wherein said function is $r = (1 + \text{acuity factor} \times R))/2.0$.

3. Apparatus for determining the effects on vision of various conditions by processing an image frame having a given number of pixels horizontally and vertically, with the value of each pixel digitized, said apparatus comprising:

means for processing the array of the digitized frame so that a non-linear smoothing of the intensity values is carried out on the basis of physiological data regarding the distribution of rods across the retina and perceptual data regarding differential visual acuity as a function of retinal field angle, the relative visual acuity curve being implemented by means for performing an adaptive convolution on the digital scene, including means for determining for each point in the array the radial distance R to the array center (which corresponds to the fovea);

means for an operator to assign a visual acuity factor as a parameter, useful values of the visual acuity facor being in the range of zero up to 0.500, increasing values producing output images which are less clear, and at a value of 1.0 the output image being completely blurred;

means for assigning to each pixel of the image a neighborhood having a radius r, the neighborhood comprising all pixels which are both within the radius r and within the image boundary, the radius r being a function of said visual acuity factor and of the distance R of the pixel from the center of the image, so that the effects of the distribution of rods in the retina provides the weighting for allocating signal processing bandwidth differentially across the scene in accordance with human physiological data;

means for summing the digital values of all pixels within said neighborhood of each pixel, means for counting the number of pixels in the neighborhood, means for dividing the resulting sum by the resulting count to form an average value, and means for assigning that average value as a new digital value for the pixel;

means for forming a new image frame with said new digital values for all of the pixels, means for providing an output array composed of the new filtered values; and means for supplying the output array to display means for viewing, with intensity proportionate to digital value.

4. Apparatus according to claim 3, wherein said function is $r = (1 + \text{acuity factor} \times R))/2.0$.

* * * * *